(12) United States Patent
Wuister et al.

(10) Patent No.: US 10,642,152 B2
(45) Date of Patent: May 5, 2020

(54) METHODOLOGY TO GENERATE A GUIDING TEMPLATE FOR DIRECTED SELF-ASSEMBLY

(71) Applicant: ASML Netherlands B.V., Veldhoven (NL)

(72) Inventors: Sander Frederik Wuister, Eindhoven (NL); Davide Ambesi, Breda (NL)

(73) Assignee: ASML Netherlands B.V, Veldhoven (NL)

( * ) Notice: Subject to any disclaimer, the term of this patent is extended or adjusted under 35 U.S.C. 154(b) by 40 days.

(21) Appl. No.: 15/034,810

(22) PCT Filed: Oct. 10, 2014

(86) PCT No.: PCT/EP2014/071814
§ 371 (c)(1),
(2) Date: May 5, 2016

(87) PCT Pub. No.: WO2015/067433
PCT Pub. Date: May 14, 2015

(65) Prior Publication Data
US 2016/0266486 A1 Sep. 15, 2016

Related U.S. Application Data

(60) Provisional application No. 61/901,968, filed on Nov. 8, 2013.

(51) Int. Cl.
*G03F 1/70* (2012.01)
*G03F 7/00* (2006.01)
(Continued)

(52) U.S. Cl.
CPC .............. *G03F 1/70* (2013.01); *G03F 7/0002* (2013.01); *G06F 30/39* (2020.01); *G06F 2119/18* (2020.01)

(58) Field of Classification Search
CPC ...... G03F 1/70; G03F 7/0002; G06F 17/5068; G06F 30/39; G06F 2219/18; B81C 1/00031
(Continued)

(56) References Cited

U.S. PATENT DOCUMENTS

| 8,336,003 B2 | 12/2012 | Cheng et al. |
| 2007/0175859 A1 | 8/2007 | Black et al. |

(Continued)

FOREIGN PATENT DOCUMENTS

| CN | 101578232 | 11/2009 |
| CN | 101681812 | 3/2010 |

(Continued)

OTHER PUBLICATIONS

International Search Report and Written Opinion dated Dec. 2, 2014 in corresponding International Patent Application No. PCT/EP2014/071814.

(Continued)

*Primary Examiner* — Paul Dinh
(74) *Attorney, Agent, or Firm* — Pillsbury Winthrop Shaw Pittman LLP

(57) ABSTRACT

A method of designing a feature guiding template for guiding self-assembly of block copolymer to form at least two features in a design layout for lithography, the feature guiding template including at least two portions joined by a bottleneck, the method including determining a characteristic of the feature guiding template based on at least a function of geometry of the feature guiding template including a value of a first width of at least one of the portions, a value of a second width of the bottleneck, or a value based on both the first width and the second width.

28 Claims, 11 Drawing Sheets

(51) Int. Cl.
*G06F 30/39* (2020.01)
*G06F 119/18* (2020.01)

(58) Field of Classification Search
USPC .......................................................... 716/55
See application file for complete search history.

(56) References Cited

U.S. PATENT DOCUMENTS

| | | | |
|---|---|---|---|
| 2010/0294740 A1* | 11/2010 | Cheng | B81C 1/00031 216/18 |
| 2010/0297847 A1* | 11/2010 | Cheng | B81C 1/00031 438/694 |
| 2010/0315614 A1 | 12/2010 | Hansen | |
| 2011/0209106 A1 | 8/2011 | Cheng et al. | |
| 2012/0331428 A1 | 12/2012 | Cheng et al. | |
| 2015/0205197 A1 | 7/2015 | Finders et al. | |
| 2016/0078160 A1 | 3/2016 | Wuister et al. | |

FOREIGN PATENT DOCUMENTS

| | | |
|---|---|---|
| CN | 101894794 | 11/2010 |
| CN | 102428022 | 4/2012 |
| CN | 103187245 | 7/2013 |
| WO | 2010/059954 | 5/2010 |
| WO | 2015/018590 | 2/2015 |
| WO | 2015/032588 | 3/2015 |

OTHER PUBLICATIONS

Jed W. Pitera, "Practical modeling of directed self-assembly for lithography," 2012 MRS Fall Meeting & Exhibit, IBM Corporation, pp. 1-29 (Nov. 25-30, 2012).

Miri Park et al., "Block Copolymer Lithography: Periodic Arrays of ~$10^{11}$ Holes in 1 Square Centimeter," Science, vol. 276, pp. 1401-1404 (May 30, 1997).

* cited by examiner

BN/CD=0.18    BN/CD=0.30    BN/CD=0.46    BN/CD=0.58    BN/CD=0.7

METHODOLOGY TO GENERATE A GUIDING TEMPLATE FOR DIRECTED SELF-ASSEMBLY

CROSS-REFERENCE TO RELATED APPLICATIONS

This application is the U.S. national phase entry of PCT patent application no. PCT/EP2014/071814, which was filed on Oct. 10, 2014, which claims the benefit of priority of U.S. provisional application No. 61/901,968, which was filed on Nov. 8, 2013, and which is incorporated herein in its entirety by reference.

FIELD

The present disclosure relates to a method of designing the formation of a lithography feature by self-assembly of block copolymer.

BACKGROUND

In lithography for device manufacture, there is an ongoing desire to reduce the size of features in a lithographic pattern in order to increase the density of features on a given substrate area. Patterns of smaller features having critical dimensions (CD) at nano-scale allow for greater concentrations of device or circuit structures, yielding potential improvements in size reduction and manufacturing costs for electronic and other devices. In projection photolithography, the push for smaller features has resulted in the development of technologies such as immersion lithography and extreme ultraviolet (EUV) lithography.

An alternative, so-called imprint lithography, generally involves the use of a "stamp" (often referred to as an imprint template) to transfer a pattern onto a substrate. An advantage of imprint lithography is that the resolution of the features is not limited by, for example, the emission wavelength of a radiation source or the numerical aperture of a projection system. Instead, the resolution is mainly limited to the pattern density on the imprint template.

Block Copolymer Self-Assembly

For both projection photolithography and for imprint lithography, it is desirable to provide high resolution patterning of surfaces, for example of a device substrate, of an imprint template or of other substrates. The use of self-assembly of a block copolymer (BCP) has been considered as a potential method for increasing the feature resolution to a smaller dimension than that obtainable by prior lithography methods or as an alternative to prior lithography methods, such as electron beam lithography for preparation of device substrates or imprint templates.

A self-assemblable BCP is a compound useful in nano-fabrication because it may undergo an order-disorder transition on cooling below a certain temperature (order-disorder transition temperature To/d) resulting in phase separation of copolymer blocks of different chemical nature to form ordered, chemically distinct domains with dimensions of tens of nanometers or even less than 10 nm. The size and shape of the domains may be controlled by manipulating the molecular weight and composition of the different block types of the copolymer. The interfaces between the domains may have a line width roughness of the order of about 1-5 nm and may be manipulated by modification of the chemical compositions of the blocks of the copolymer.

The feasibility of using a thin film of BCP as a self-assembling template for pattern formation was demonstrated by Chaikin and Register, et al., Science 276, 1401 (1997). Dense arrays of dots and holes with dimensions of 20 nm were transferred from a thin film of poly(styrene-block-isoprene) to a silicon nitride substrate.

A BCP comprises different blocks, each typically comprising one or more identical monomers, and arranged side-by side along the polymer chain. Each block may contain many monomers of its respective type. So, for instance, an A-B BCP may have a plurality of type A monomers in the (or each) A block and a plurality of type B monomers in the (or each) B block. An example of a suitable BCP is, for instance, a polymer having covalently linked blocks of polystyrene (PS) monomer (hydrophobic block) and polymethylmethacrylate (PMMA) monomer (hydrophilic block). Other BCPs with blocks of differing hydrophobicity/hydrophilicity may be useful. For instance a tri-block copolymer such as (A-B-C) BCP may be useful, as may an alternating or periodic BCP e.g. $[-A-B-A-B-A-B-]_n$ or $[-A-B-C-A-B-C]_m$ where n and m are integers. The blocks may be connected to each other by covalent links in a linear or branched fashion (e.g., a star or branched configuration).

A BCP may form many different phases upon self-assembly, dependent upon the volume fractions of the blocks, degree of polymerization within each block type (i.e. number of monomers of each respective type within each respective block), and the optional use of a solvent and surface interactions. When applied in a thin film, geometric confinement may pose additional boundary conditions that may limit the phases formed. In general, spherical (e.g. cubic), cylindrical (e.g. tetragonal or hexagonal) and lamellar phases (i.e. self-assembled phases with cubic, hexagonal or lamellar space-filling symmetry) are practically observed in thin films of self-assembled BCPs.

The phase type observed may depend upon the relative molecular volume fractions of the different polymer blocks. For instance, a molecular volume ratio of 80:20 will provide a cubic phase of discontinuous spherical domains of the low volume block arranged in a continuous domain of the higher volume block. As the volume ratio reduces to 70:30, a cylindrical phase will be formed with the discontinuous domains being cylinders of the lower volume block. At a 50:50 ratio, a lamellar phase is formed. With a ratio of 30:70 an inverted cylindrical phase may be formed and at a ratio of 20:80, an inverted cubic phase may be formed.

Suitable BCPs for use as a self-as semblable polymer include, but are not limited to, poly(styrene-b-methylmethacrylate), poly(styrene-b-2-vinylpyridone), poly(styrene-b-butadiene), poly(styrene-b-ferrocenyldimethylsilane), poly(styrene-b-ethyleneoxide), poly(ethyleneoxide-b-isoprene). The symbol "b" signifies "block". Although these are di-block copolymer examples, it will be apparent that self-assembly may also employ a tri-block, tetra-block or other multi-block copolymer.

One method used to guide or direct self-assembly of a polymer (such as a BCP) onto a substrate surface is known as graphoepitaxy. This method involves the self-organization of a BCP guided by topological pre-patterning on the substrate using one or more features constructed of resist (or one or more features transferred from resist onto a substrate surface, or one or more features transferred onto a film stack deposited on the substrate surface). The pre-patterning is used to form an enclosure or "recess" comprising a substrate base and a sidewall, e.g., a pair of opposing side-walls, of resist (or a side-wall formed in a film or a side-wall formed in the substrate).

Typically, the height of a feature of a graphoepitaxy guiding template is of the order of the thickness of the BCP layer to be ordered, so may be, for instance, from about 20 nm to about 150 nm.

A lamellar self-assembled BCP can form a parallel linear pattern of lithography features with adjacent lines of the different polymer block domains in the recess. For instance if the BCP is a di-block copolymer with A and B blocks within the polymer chain, the BCP may self-assemble into an ordered layer in each recess, the layer comprising regularly spaced first domains of A blocks, alternating with second domains of B blocks.

Similarly, a cylindrical self-assembled BCP can form an ordered pattern of lithography features comprising cylindrical discontinuous first domains surrounded by a second continuous domain. For instance, if the BCP is a di-block copolymer with A and B blocks within the polymer chain, the A block may assemble into a cylindrical discontinuous domain within a circular recess and surrounded by a continuous domain of B block. Alternatively, the A block may assemble into cylindrical discontinuous domains regularly spaced across a linear recess and surrounded by a continuous domain of B block.

Graphoepitaxy may be used, therefore, to guide the self-organization of lamellar or cylindrical phases such that the BCP pattern subdivides the spacing of the side wall(s) of a recess into domains of discrete copolymer patterns.

In a process to implement the use of BCP self-assembly in nanofabrication, a substrate may be modified with a neutral orientation control layer, as part of the graphoepitaxy guiding template, to induce the preferred orientation of the self-assembly pattern in relation to the substrate. For some BCPs used in self-assemblable polymer layers, there may be a preferential interaction between one of the blocks and the substrate surface that may result in orientation. For instance, for a polystyrene(PS)-b-PMMA BCP, the PMMA block will preferentially wet (i.e. have a high chemical affinity with) an oxide surface and this may be used to induce the self-assembled pattern to lie oriented substantially parallel to the plane of the surface. Substantially normal orientation may be induced, for instance, by depositing a neutral orientation layer onto the surface rendering the substrate surface neutral to both blocks, in other words the neutral orientation layer has a similar chemical affinity for each block, such that both blocks wet the neutral orientation layer at the surface in a similar manner. By "normal orientation" it is meant that the domains of each block will be positioned side-by-side at the substrate surface, with the interfacial regions between adjacent domains of different blocks lying substantially perpendicular to the plane of the surface.

In a graphoepitaxy guiding template for aligning a di-block copolymer having A and B blocks, where A is hydrophilic and B is hydrophobic in nature, the graphoepitaxy pattern may comprise hydrophobic side-wall features, with a neutral orientation base between the hydrophobic features. The B domain may preferentially assemble alongside the hydrophobic features, with several alternating domains of A and B blocks aligned over the neutral orientation region between the pinning features of the graphoepitaxy guiding template.

A neutral orientation layer may, for instance, be created by use of random copolymer brushes which are covalently linked to the substrate by reaction of a hydroxyl terminal group, or some other reactive end group, to oxide at the substrate surface. In other arrangements for neutral orientation layer formation, a crosslinkable random copolymer or an appropriate silane (i.e. molecules with a substituted reactive silane, such as a (tri)chlorosilane or (tri)methoxysilane, also known as silyl, end group) may be used to render a surface neutral by acting as an intermediate layer between the substrate surface and the layer of self-assemblable polymer. Such a silane based neutral orientation layer will typically be present as a monolayer whereas a crosslinkable polymer is typically not present as a monolayer and may have a layer thickness of typically less than or equal to about 40 nm, or less than or equal to about 20 nm.

A thin layer of self-assemblable BCP may be deposited onto a substrate having a graphoepitaxy guiding template as set out above. A suitable method for deposition of the self-assemblable polymer is spin-coating, as this process is capable of providing a well-defined, uniform, thin layer of self-assemblable polymer. A suitable layer thickness for a deposited self-assemblable polymer film is approximately 10 nm to 150 nm.

Following deposition of the BCP film, the film may still be disordered or only partially ordered and one or more additional steps may be needed to promote and/or complete self-assembly. For instance, the self-assemblable polymer may be deposited as a solution in a solvent, with solvent removal, for instance by evaporation, prior to self-assembly.

Self-assembly of a BCP is a process where the assembly of many small components (the BCP) results in the formation of a larger more complex structure (the nanometer sized features in the self-assembled pattern). Defects arise naturally from the physics controlling the self-assembly of the polymer. Self-assembly is driven by the differences in interactions (i.e. differences in mutual chemical affinity) between A/A, B/B and A/B (or B/A) block pairs of an A-B BCP, with the driving force for phase separation described by Flory-Huggins theory for the system under consideration. The use of graphoepitaxy may greatly reduce defect formation. The Flory-Huggins interaction parameter (chi value), and the degree of polymerization of the BCP blocks (N value) are parameters of the BCP which affect the phase separation, and the dimensions with which self-assembly of a particular BCP occurs.

For a polymer which undergoes self-assembly, the self-assemblable polymer will exhibit an order-disorder temperature To/d. To/d may be measured by any suitable technique for assessing the ordered/disordered state of the polymer, such as differential scanning calorimetry (DSC). If layer formation takes place below this temperature, the molecules will be driven to self-assemble. Above the temperature To/d, a disordered layer will be formed with the entropy contribution from disordered A/B domains outweighing the enthalpy contribution arising from favorable interactions between neighboring A-A and B-B block pairs in the layer. The self-assemblable polymer may also exhibit a glass transition temperature Tg below which the polymer is effectively immobilized and above which the copolymer molecules may still reorient within a layer relative to neighboring copolymer molecules. The glass transition temperature is suitably measured by differential scanning calorimetry (DSC).

Defects formed during ordering as set out above may be partly removed by annealing. A defect such as a disclination (which is a line defect in which rotational symmetry is violated, e.g. where there is a defect in the orientation of a director) may be annihilated by pairing with other another defect or disclination of opposite sign. Chain mobility of the self-assemblable polymer may be a factor for determining defect migration and annihilation and so annealing may be carried out at a temperature where chain mobility is high but the self-assembled ordered pattern is not lost. This implies temperatures up to a few ° C. above or below the order/disorder temperature To/d for the polymer.

Ordering and defect annihilation may be combined into a single annealing process or a plurality of processes may be used in order to provide a layer of self-assembled polymer such as BCP, having an ordered pattern of domains of differing chemical type (of domains of different block types).

In order to transfer a pattern, such as a device architecture or topology, from the self-assembled polymer layer into the substrate upon which the self-assembled polymer is deposited, typically a first domain type will be removed by so-called breakthrough etching to provide a pattern of a second domain type on the surface of the substrate with the substrate laid bare between the features of the second domain type. A pattern having parallel cylindrical phase domains can be etched using a dry etching or reactive ion etching technique. A pattern having lamellar phase domains can utilize a wet etching technique in addition to or as an alternative to those suitable for the etching of parallel cylindrical phase domains.

Following the breakthrough etching, the pattern may be transferred by so-called transfer etching using an etching means which is resisted by the second domain type and so forms recesses in the substrate surface where the surface has been laid bare.

While the discussion herein focuses on graphoepitaxy guiding templates, it will be appreciated that a guiding template may involve a technology other than, or in addition to, graphoepitaxy. For example, the guiding template may be a chemoepitaxy template involving chemical surface modification of the guiding template, wherein the chemical modification facilitates guiding of the self-assembly. For example, in a chemoepitaxy guiding template for aligning a di-block copolymer having A and B blocks, where A is hydrophilic and B is hydrophobic in nature, the surface of the template may comprise one or more hydrophobic strips with a neutral orientation base between the hydrophobic features. The strips have a similar function as the one of more hydrophobic walls of a graphoepitaxy guiding template.

Optical Proximity Correction (OPC)

As an example, OPC addresses the fact that the final size and placement of an image of a design pattern projected on a substrate will not be identical to, or simply depend only on, the size and placement of the one or more features of the design pattern at the patterning device. It is noted that the terms "mask", "reticle", "patterning device" are utilized interchangeably herein. Furthermore, masks and reticles can be broadly termed "patterning devices." Further, a person skilled in the art will recognize that, especially in the context of lithography simulation and optimization, the term "mask," "patterning device" and "design pattern" can be used interchangeably, as in lithography simulation and optimization, a physical patterning device is not necessarily used but a design pattern can be used to represent a physical patterning device. For small feature sizes and/or high feature densities present on some design pattern, the position of a particular edge of a given feature may be influenced to a certain extent by the presence or absence of other adjacent features. These proximity effects arise from minute amounts of radiation coupled from one feature to another and/or non-geometrical optical effects such as diffraction and interference. Similarly, proximity effects may arise from diffusion and other chemical effects during post-exposure bake (PEB), resist development, and etching that generally follow lithography.

A source and patterning device optimization method and system that allows for simultaneous optimization of the source and patterning device using a cost function without constraints and within a practicable amount of time is described in PCT Patent Application Publication No. WO 2010/059954, which is hereby incorporated by reference in its entirety.

Another source and mask optimization method and system that involves optimizing the source by adjusting pixels of the source is described in U.S. Patent Application Publication No. 2010/0315614, which is hereby incorporated by reference in its entirety.

SUMMARY

According to an embodiment, there is provided a method of designing a feature guiding template for guiding self-assembly of block copolymer to form at least two features in a design layout for lithography, the feature guiding template comprising at least two portions joined by a bottleneck, the method comprising: determining a characteristic of the feature guiding template based on at least a function of geometry of the feature guiding template comprising a value of a width of the bottleneck, or a value based on or comprising both a width of at least one of the portions and the width of the bottleneck.

According to an embodiment, there is provided a method of determining a characteristic of a feature guiding template for guiding self-assembly of block copolymer to form at least two features in a design layout for lithography, the method comprising: determining a guiding template for each of the at least two features without accounting for the others of the at least two features; and determining a characteristic of the feature guiding template based on at least a function of geometry of the feature guiding template, the feature guiding template being the joining of each of the guiding templates for the two or more features.

According to an embodiment, there is provided a method, comprising designing a geometric characteristic of a feature guiding template based on at least a function of geometry of the feature guiding template, the feature guiding template for guiding self-assembly of block copolymer to form at least two features in a design layout for lithography and comprising at least two portions joined by a bottleneck.

According to an embodiment, there is provided a computer readable non-transitory medium with instructions stored therein, configured to cause a computer to carry out a method as described herein.

According to an embodiment, there is provided a computer apparatus comprising: a physical memory storing processor readable instructions, and a physical processor arranged to read and execute instructions stored in the physical memory, wherein the physical processor readable instructions comprise instructions arranged to control the computer to carry out a method as described herein.

According to an embodiment, there is provided a feature guiding template designed using an embodiment of the invention as described herein. According to an embodiment, there is provided an integrated circuit produced using the feature guiding template designed using an embodiment of the invention as described herein.

According to an embodiment, there is provided a feature guiding template comprising two or more portions connected to one or more elements, wherein a ratio of a width of the one or more elements to a width of one of the two or more portions is from 0.3 to 0.5. The width of the one of the two or more portions may be from 30 to 60 nm. The width of the one or more elements may be from 9 to 30 nm. The center-to-center distance of two of the two or more portions may be from 22 to 66 nm.

One or more aspects of the disclosure herein may, where appropriate to one skilled in the art, be combined with any one or more other aspects described herein, and/or with any one or more features described herein.

BRIEF DESCRIPTION OF THE DRAWINGS

Specific embodiments of the invention will be described with reference to the accompanying Figures, in which.

DETAILED DESCRIPTION

Figure 1A:
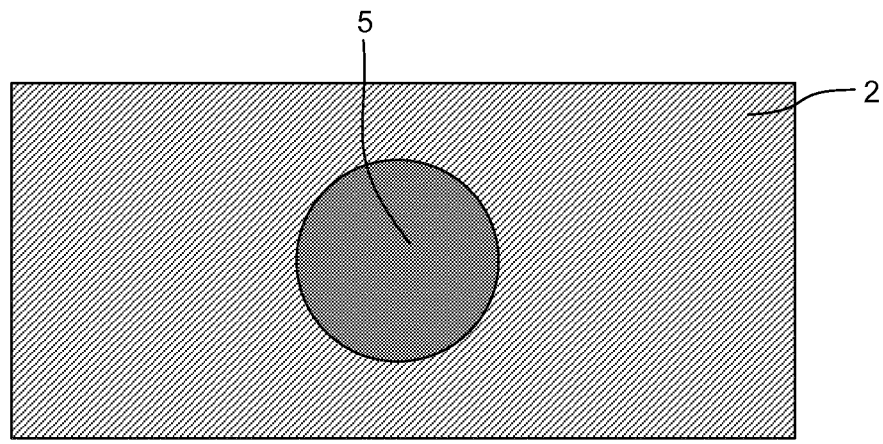
FIGS. 1A-1E schematically depict directed self-assembly of A-B block copolymer on a substrate by a guiding template.
Figure 1B:
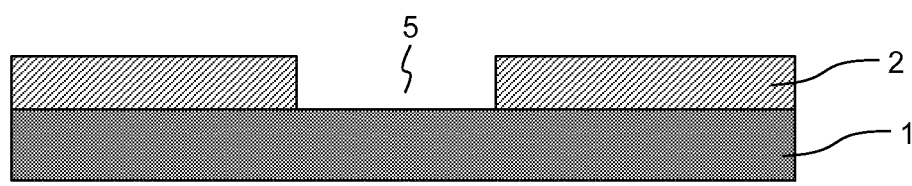

FIGS. 1A and 1B show, in plan view and cross-section respectively, part of a substrate 1 to which a lithography process using self-assembly of BCP is applied. An anti-reflection coating may be present on the surface of the substrate 1. The anti-reflection coating (if present) may be an organic material, such as, for example, ARC 29, from Brewer Science Inc. of Rolla, Mo. The anti-reflection coating may be an inorganic material such as, for example, SiC or SiON. A neutral layer may be provided on the anti-reflection coating. A layer of resist 2 is applied to the substrate 1. The layer of resist 2 may, for example, be a photo-resist. In an embodiment, the resist is a negative tone developed resist (resist developed by an organic developer). This type of resist is typically compatible with the organic solvent used in the spin coating of the block copolymer. The layer of resist 2 is patterned to form a contact hole (via) recess 5 for use in the self-assembly of the block copolymer. The recess 5 may be formed by photolithography, imprint lithography or another lithographic process. For the purposes of the self-assembly, the recess 5 need not be in the resist. For example, the recess 5 may be formed in a lower layer by, e.g., etching through an opening in the resist 2 (such as shown in FIGS. 1A and 1B). Hereafter, for convenience, the recess 5 is described and depicted as being in the resist 2 although it need not be.

Figure 1C:
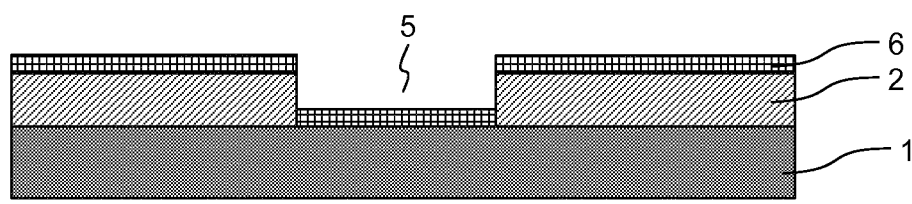
Figure 1D:
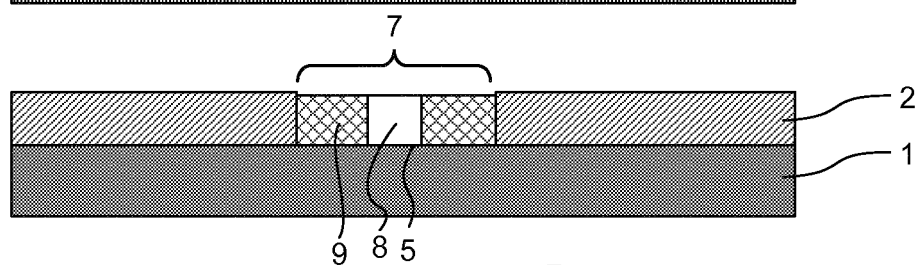
Figure 1E:
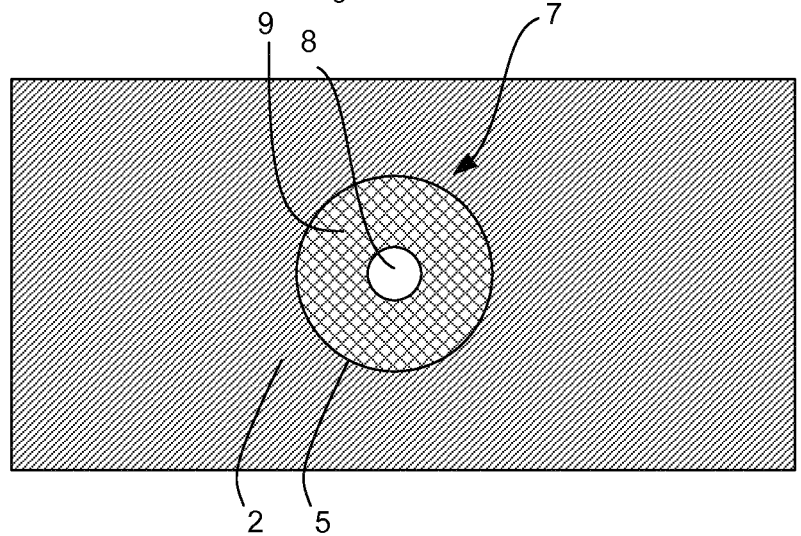

In FIG. 1C, a BCP layer 6 has been deposited onto the substrate 1 and the resist 2. The BCP layer 6 is shown with a uniform thickness within the recess 5, and on top of the resist 2. In FIGS. 1D and 1E, which show cross-section and plan views respectively, the BCP layer 6 has been thermally annealed (thereby causing self-assembly of the BCP material to occur). The thermal annealing process causes a redistribution of the BCP material, with the BCP material being transported from a region above resist 2 into the recess 5. For simplicity all of the BCP material has been depicted as being transported into the recess 5. However, in practice, some BCP material may remain in the region above the resist 2. Solvent annealing may be used instead of thermal annealing (a solvent swells a block copolymer thereby increasing its mobility such that rearrangement of the block copolymer is possible).

The use of a BCP material allows domains of component polymer material to be self-assembled within a BCP feature. For example, the BCP deposited within the recess 5 can be seen to have formed distinct domains of polymer. A type A polymer domain 8 is formed as, for example, a cylinder and is surrounded by a continuous type B polymer domain 9. The type A polymer domain 8 and the type B polymer domain 9 form a BCP feature 7 within the recess 5. In an embodiment, the type B polymer domain 9 is formed as, for example, a cylinder and is surrounded by a continuous type A polymer domain 8.

As noted above, a neutral orientation layer may be provided on the substrate. The neutral orientation layer may have a similar chemical affinity for the type A polymer block and the type B polymer block, such that both blocks wet the neutral orientation layer in a similar manner. This may promote domains of type A and B polymers to form which have a normal orientation (i.e. substantially perpendicular to the surface of the substrate). The neutral orientation layer may have a surface energy which is greater than a surface energy of one of the two polymer domains 8 and 9 and less than a surface energy of the other of the two polymer domains 8 and 9.

To guide the self-assembly, a lateral dimension is controlled by, for example, the spacing of one or more walls. The width (e.g., diameter) of the recess 5 may, for example, be approximately 70 nanometers. The width of the recess 5 may, for example, be in the range of between approximately 20 nanometers and approximately 100 nanometers. The width (e.g., diameter) of the type A polymer domain 8 inside the recess 5 may, for example, be approximately 30 nanometers. The width (e.g., diameter) of the type A polymer domain 8 inside the recess 5 may, for example, be in the range of between approximately 5 nanometers and approximately 50 nanometers.

The BCP material thickness also influences the self-assembly process. The thickness of the BCP layer within the recess 5 may be optimized for the formation of distinct domains of type A and type B polymer.

Figure 2:
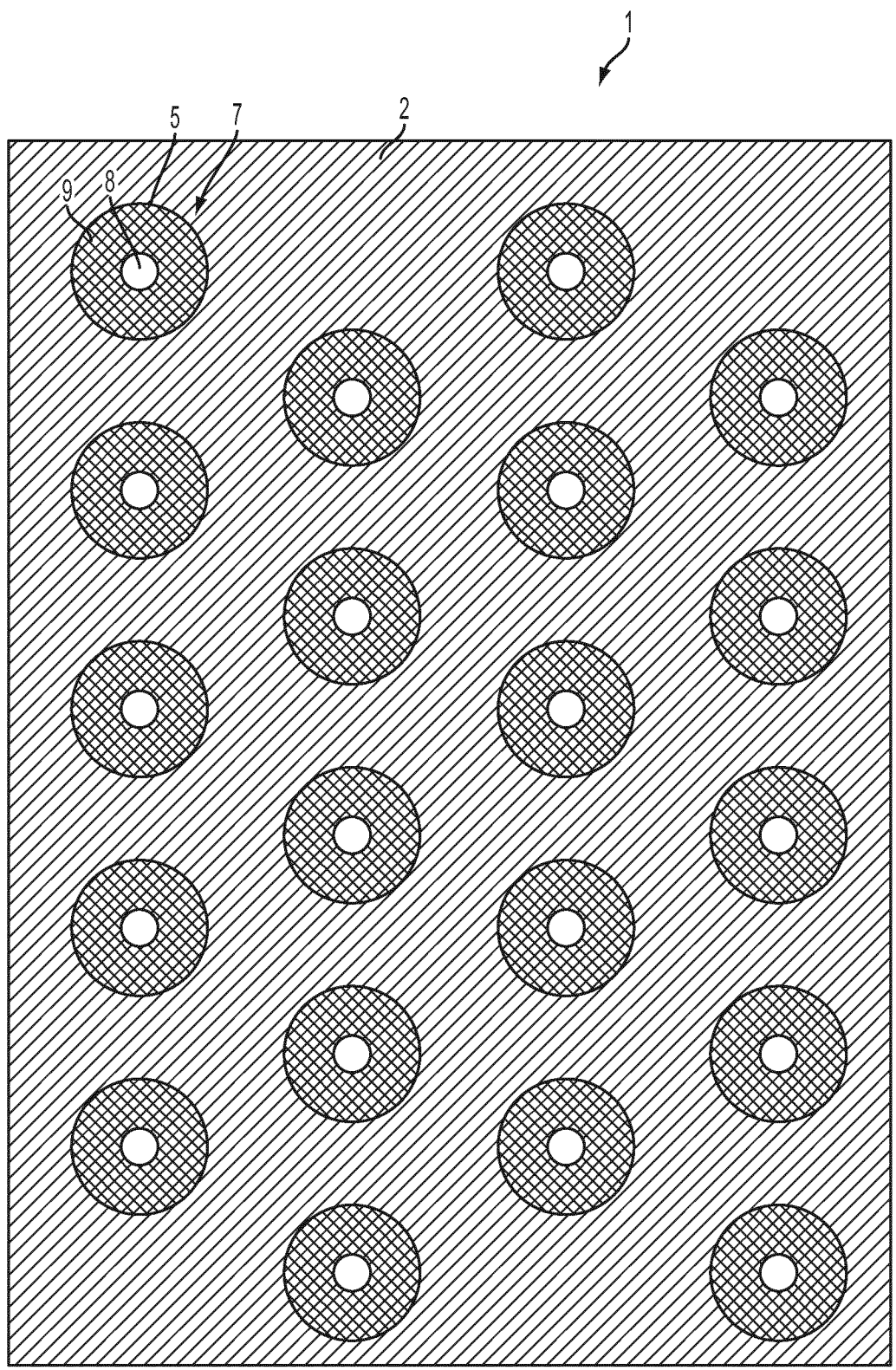
FIG. 2 schematically depicts a plurality of A-B block copolymer features on a substrate.

A plurality of BCP features 7 may be formed on a single substrate 1. For example, a formation of a plurality of cylindrical BCP features (such as the cylindrical BCP feature 7 depicted in FIG. 1), may be formed on a substrate 1. FIG. 2 schematically depicts in plan view a larger part of the substrate 1 to which a lithography process using self-assembly of BCP has been applied. A layer of resist 2 is applied to the substrate 1. The layer of resist 2 is patterned with a plurality of recesses 5. A BCP layer is deposited onto the substrate 1 and a thermal annealing process applied to the BCP layer. A respective BCP feature 7 is formed within each of the recesses 5. The BCP features 7 each comprise a type A polymer domain 8 and a type B polymer domain 9. The type A polymer domain 8 is formed as, for example, a cylinder and is surrounded by the continuous type B polymer domain 9. The type A polymer domain 8 may, for example, comprise blocks of polymethylmethacrylate (PMMA) monomer. The type B polymer domain 9 may, for example, comprise blocks of polystyrene (PS) monomer. Suitable block copolymers for use as self-assemblable polymers include, but are not limited to, poly(styrene-b-methylmethacrylate), poly(styrene-b-2-vinylpyridone), poly(styrene-b-butadiene), poly(styrene-b-ferrocenyldimethylsilane), poly(styrene-b-ethyleneoxide), poly(ethyleneoxide-b-isoprene), poly(styrene-b dimethylsiloxane), poly(styrene-b-lactic acid), poly(dimethylsiloxane-b-lactic acid). The symbol "b" signifies "block". Although these foregoing block copolymers are di-block copolymers, self-assembly may also employ tri-block, tetrablock or other multi-block copolymers.

The BCP feature 7 may further comprise a second type A polymer domain (e.g. blocks of PMMA monomer) positioned around the periphery of the type B polymer domain 9. The second type A polymer domain may, for example, be in contact with the wall(s) of the recess 5. For simplicity the second type A polymer domain is not depicted in the Figures, however it will be appreciated that one or more additional polymer domains other than those depicted may be present in any given BCP feature 7.

The accuracy with which a type A polymer domain is positioned on the substrate is a significant factor in the manufacturing of a device using self-assembly block copolymer. For example a device may be manufactured by patterning a first plurality of features onto the substrate 1. The first plurality of features may, for example, correspond with the type A polymer domains 8 depicted in FIG. 2. This may be achieved, for example, by exposing the resist 2, the type A polymer domains 8 and the type B polymer domains 9 to an etching process. The etching process may remove the type A polymer domains 8. The etching process therefore exposes regions of the substrate 1 below the type A polymer domains 8. The resist 2 and the type B polymer domains 9 may be resistant to the etching process and may remain in place. A further etch process may be performed to etch the exposed regions of the substrate, thereby patterning features into the substrate which correspond with the type A polymer domains 8. These features may for example form contact holes of an integrated circuit.

The resist 2 and the type B polymer domains 9 may subsequently be removed from the substrate and a new layer of resist 2 may be deposited onto the substrate 1. A second plurality of features may then be patterned onto the substrate 1 by forming a second plurality of recesses 5 in the new layer of resist 2. A BCP layer 6 may then be deposited onto the substrate 1 and exposed to an annealing process, thereby forming a second plurality of BCP features 7 comprising a second plurality of type A polymer domains 8. One or more etching processes may then be performed to pattern a second plurality of features onto the substrate 1. The second plurality of features correspond to the second plurality of type A polymer domains 8.

When manufacturing a device using BCP, it is desirable, for example, that a feature of a plurality of features is accurately aligned relative to another of the plurality of features. Additionally or alternatively, it is desirable, for example, that the first plurality of features is accurately aligned relative to the second plurality of features.

In general, a device may be manufactured using other methods and features than those described above. For example a BCP feature having another shape and/or configuration than the uniformly arranged cylindrical shapes depicted in FIGS. 1 and 2 may be patterned onto a substrate. Indeed, while this description considers the example of contact hole formation (e.g., contact hole shrink where a contact hole shape printed with a lithography technique is filled with block copolymer to form the smaller contact hole) which contact hole may serve as a via in logic and/or in cut mask applications, the application of the embodiments discussed herein are not limited to contact hole formation.

Figure 3:
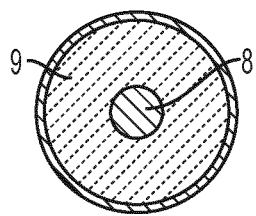
FIG. 3 is a schematic example of the formation of a block copolymer feature, such as shown in FIG. 1.

A BCP feature 7 may be simulated as a thermodynamic system and one or more macroscopic properties of the BCP feature may be determined through statistical mechanics. For example, without being bound by any theory, FIG. 3 is a schematic example of the example chemical nature of the formation of a single block copolymer feature, such as shown in FIG. 1. FIG. 3 schematically depicts, in this case, a type A polymer domain 8 formed as, for example, a cylinder and surrounded by continuous type B polymer domain 9 within a recess 5. The type A polymer domain 8 may, for example, comprise polymethylmethacrylate (PMMA) monomer. The type B polymer domain 9 may, for example, comprise polystyrene (PS) monomer. In this case, a second type A polymer domain (e.g. PMMA) is positioned around the periphery of the type B polymer domain 9. The second type A polymer domain is in contact with the wall(s) of the recess 5.

Using self-assembly of BCP in a lithographic process can benefit from a computationally inexpensive method of determining one or more characteristics (e.g., height, shape, feature spacing, material, side wall angle and/or surface chemistry, etc.) of a guiding template to form a desired pattern to be transferred onto the substrate. Using FIG. 1 as an example, the type A polymer domains 8 may be removed by etching and an area of the substrate below the type A polymer domains 8 may be exposed for further processing (e.g., etching, deposition), thereby transferring the shape of the type A polymer domains 8 onto the substrate. One or more characteristics of the recess 5—the guiding template in this example—affect the position and shape of the type A polymer domains 8, and thus the pattern transferred onto the substrate 1. In a given lithography process (e.g., radiation source shape, wavelength, projection optics in the lithographic projection apparatus, resist, post exposure baking, resist development, etching, deposition, etc.) using a given BCP, for the pattern transferred onto the substrate 1 to be the desired pattern, the recess 5—the guiding template in this example—should possess one or more suitable characteristics.

However, determining the desired or ideal characteristics (e.g., the desired or ideal shape) of the guiding template is difficult. This is particularly so for a plurality of elemental features in relatively close proximity. For such a group of features, each feature may be formed in its own separate guiding template structure, or may be formed in a common guiding template structure (e.g., an elongate shape). In a hybrid, the guiding template structure may essentially comprise portions for each feature and one or more elements (e.g., one or more bottlenecks) to connect the portions together.

Indeed, it is not known what is, e.g., an ideal characteristic of the guiding template for a group of elemental features (such as contact holes). A dumbbell or peanut-like shape (as described in more detail hereafter) may be suitable for a guiding template for a group of elemental features. But, for example, it not apparent what size of the portions and/or of the bottle-neck is needed to keep the placement error of the features reasonably small. Accordingly, it would be desirable to have a factor or function that can be used to determine a characteristic (e.g., shape) of such a guiding template and a method to determine the characteristic and/or design the guiding template, where desirably the guiding template can be relatively easily formed (e.g., using lithographic printing) and realize small placement error of self-assembled block copolymer features.

One method of determining a characteristic of (and thus designing) a guiding template from a desired pattern transferred onto the substrate relies on an iterative first-principle calculation of the self-assembly in a guiding template. This method may be accurate but can be time consuming and computationally expensive, to the extent of potentially involving impractical amounts of computational resources.

The time and/or computation costs of this derivation may be reduced by using a rule-based approach. Specifically, one or more characteristics of a guiding template for a group of elemental features under a variety of conditions may be calculated using any suitable method, including rigorous methods such as the iterative first-principle calculation and/or any of the methods described herein. The group of elemental features may include patterns that are often included in a design layout and/or repetitive patterns in a design layout, such as contact holes, isolation trenches, vias, leads, mask cut lines, gate electrodes, etc.

Figure 4:
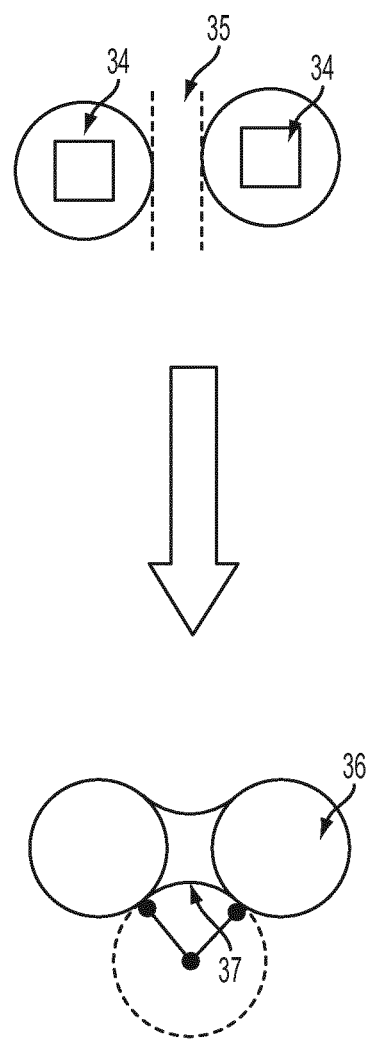
FIG. 4 schematically depicts an example of two features at a patterning device and a guiding template associated with those features.

Calculation of the characteristic of a guiding template for the group of elemental features may take into account many factors such as manufacturability of the group of elemental features at the substrate. In an example schematically depicted in FIG. 4, if the distance 35 between two features 34 (contact holes in this example) is too short to be reliably manufactured at the substrate, the guiding templates for these features 34 may be merged into a feature (or joined) guiding template 36, such that no curvature on the feature (or joined) guiding template 36 is greater than a maximum curvature 37. The maximum curvature $$\kappa_{max} = \frac{4NA}{\lambda},$$

wherein NA is the numerical aperture of the projection optics to project the pattern of the guiding template onto the substrate, and λ is the wavelength of the radiation used to project the pattern. $1/\kappa_{max}$ (e.g., minimum radius of the curve) in deep ultraviolet radiation (DUV) lithography using 193 nm is typically about 36 nm (for a NA of 1.35). $1/\kappa_{max}$ (e.g., minimum radius of the curve) in extreme ultraviolet radiation (EUV) lithography using 13.5 nm is typically about 10 nm (for NA of 0.33).

Other factors that may be taken into account in the calculation of the characteristic of a guiding template may include placement error of at least one of the features, chemical composition of the block copolymer, structure of the block copolymer (e.g., linear, star-shaped, etc.), thickness of the block copolymer, annealing temperature of the block copolymer, annealing rate of the block copolymer, and/or solvent for the block copolymer.

Other features may be applied in the embodiments herein, for example, maximum curvature, chemical composition of the BCP (e.g., block length), displacement from minimum energy position, placement error. More details may be found in U.S. Patent Application Nos. 61/874,854, 61/874,875, and 61/680,042, each of which is hereby incorporated by reference in its entirety.

According to an embodiment, calculation of the characteristic according to any of the methods herein may take into account a function of the geometry of the guiding template. According to an embodiment, the function of the geometry of the guiding template may have a constraint.

Figure 5:
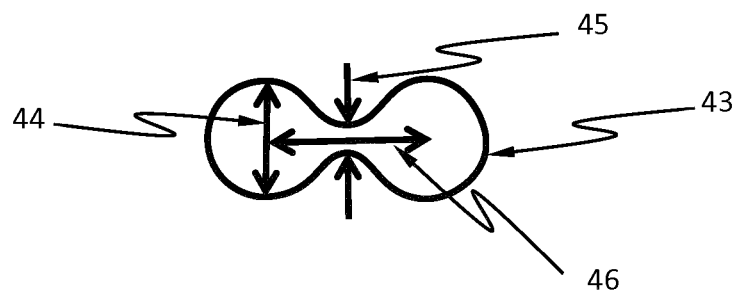
FIG. 5 schematically depicts the shape of a guiding template for an exemplary group of elemental features of two features (e.g., contact holes) in close spatial proximity.

FIG. 5 schematically depicts the shape of a guiding template 43 for an exemplary group of elemental features of, e.g., two contact holes in close spatial proximity. The guiding template 43 generally resembles a dumbbell or peanut in shape and comprises at least two portions (e.g. circular portions) joined by one or more bottlenecks.

Having regard to FIG. 5, in determining a characteristic of a guiding template, the function of the geometry may be, e.g., the width (e.g., diameter) (CD) 44 of one or more of the portions (e.g., corresponding to a width of an outer surface of a contact hole or being a width from one part of an inner surface of a guiding template portion to another part of the inner surface), the width (BN) of a bottleneck 45 between at least two of the portions (e.g., the guiding template recess portions for contact holes), the center-to-center distance (CC) 46 of at least two of the portions (e.g., the guiding template recess portions for contact holes), and/or a function (e.g., a ratio) of the width 45 and the width 44. In an embodiment, the width CD may be a critical dimension of the template. In an embodiment, the function is a ratio of the width 45 to the width 44, which is a dimensionless number obtained by dividing the BN by the CD (i.e., BN/CD ratio), both belonging to the same feature. In an embodiment, the portions have a substantially same value of CD. In an embodiment, the value of CD of one of the portions may be within 95-100%, 90-100% or 85-100% of the value of CD of another of the portions.

Figure 6:
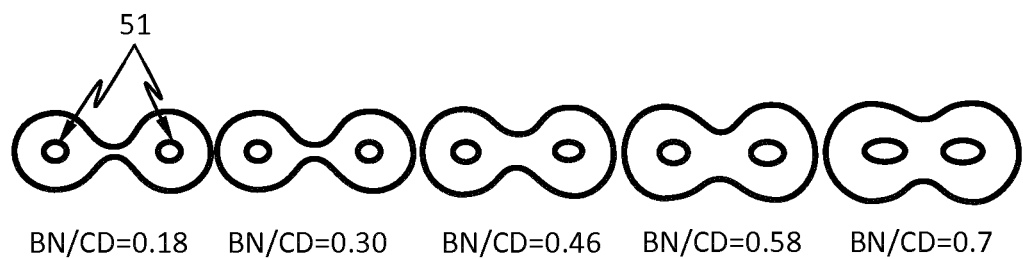
FIG. 6 schematically depicts a series of guiding templates with different BN/CD ratios.

FIG. 6 schematically depicts a series of guiding templates with different BN/CD ratios, with different values of CC but with a constant minimum radius of 10 nm and a constant CD=44 nm. The oval features such as 51 schematically mark the positions of type A polymer domains formed by self-assembly of a BCP in the respective guiding templates.

Figure 7:
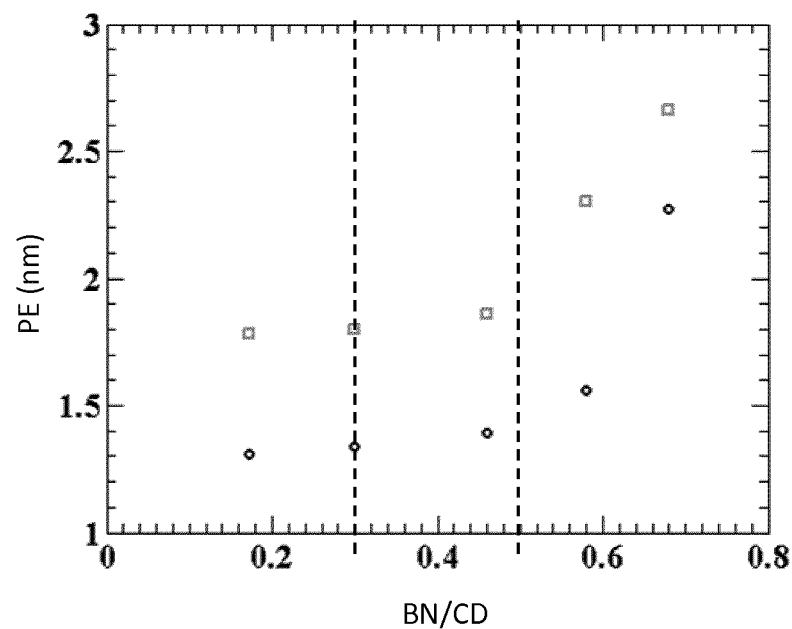
FIG. 7 shows placement error (PE) of the type A polymer domain in the series of guiding templates in FIG. 6.

FIG. 7 shows placement error (PE) (open circles, with a value of 44 nm for CD) of the type A polymer domain in the series of guiding templates in FIG. 6, and PE (open squares, with a value of 54 nm for CD) of the type A polymer domains in a series of guiding templates with different BN/CD ratios, with different values of CC but with a constant minimum radius of 10 nm and a constant CD=54 nm, as determined by simulation with the assumption that the guiding templates are rigid in their shapes. This assumption may not be true for guiding templates formed in a non-rigid material, e.g., a resist layer, but should be valid for guiding templates formed in a substrate. For a non-rigid guiding template material, a factor to account for the non-rigidity should introduced. In this example, the placement error for a single contact hole (closed cylinder) is around 1.3 nm (3 sigma).

Having regard to FIG. 7, when the ratio BN/CD is greater than 0.5, the PE rapidly increases. Therefore, a guiding template with the ratio BN/CD greater than 0.5 is undesirable. The lower bound of the ratio BN/CD is set by, e.g., the lithography resolution (i.e., the maximum curvature) and/or stochastic effect (e.g., shot noise). In an embodiment, the lower bound of the ratio BN/CD is 0.3.

Without being bound by any theory, it is believed that the increase in placement error shown in FIG. 7 is driven by the geometry of the guiding template. Smaller CD, a shorter polymer in the block copolymer or a non-linear block copolymer may lead to smaller placement error, although the absolute trend appears to remain the same, i.e., placement error significantly increases when the ratio BN/CD is greater than 0.5.

Thus, the width (BN) of a bottleneck 45 between at least two of the portions (e.g., the guiding template recess portions for contact holes) and/or a function (e.g., a ratio) of the width 45 and the width 44 may be an effective design parameter for a guiding template shape. It may provide a constraint or restriction on the printable guiding template shape due to placement error requirements. In an embodiment, the parameter is BN/CD ratio. In an embodiment, the BN/CD ratio is selected from the range of 0.3-0.5. In an embodiment, the BN/CD ratio is selected from the range of 0.48-0.52. In an embodiment, the BN/CD ratio is selected from the range of 0.49-0.51. In an embodiment, the BN/CD ratio is selected from the range of 0.47-0.53. In an embodiment, the BN/CD ratio is selected from the range of 0.46-0.53. In an embodiment, the BN/CD ratio is selected from the range of 0.45-0.53. According to an embodiment, the at least two portions have substantially the same width. These ranges tend to benefit the lithography process, e.g., giving larger process windows.

As discussed herein, such a parameter may be used in a rule-based approach to determine a characteristic (e.g., design) of a guiding template. As discussed herein, such a parameter may be used in conjunction with one or more other parameters in an optimization-type process. For example, such a parameter may be used to realize a guiding template shape where critical dimension of the feature is maximized.

Figure 8:
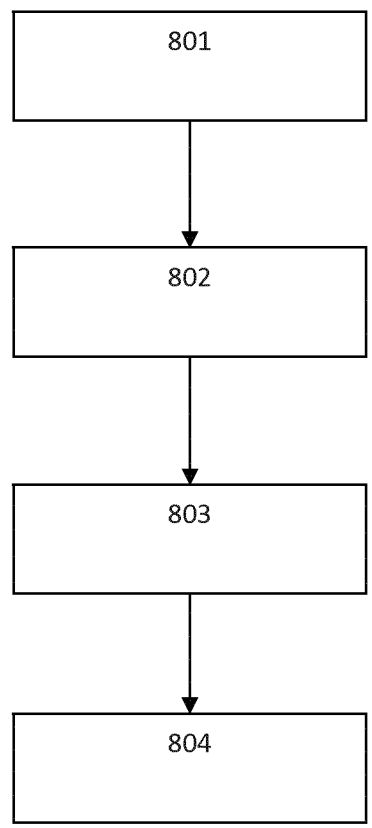
FIG. 8 is a flow chart of a method according to an embodiment.

According to an embodiment, a method of determining one or more characteristics of a guiding template for two or more spatially proximate features of a design layout is shown in the flow chart in FIG. 8. In step 801, a design layout comprising the two or more spatially proximate features is obtained. For example, a full chip design may be analyzed for contact hole constructs, which may be extracted by a suitable algorithm. In step 802, a characteristic of a guiding template for each of the two or more spatially proximate features is determined without accounting for the others of the two or more spatially proximate features. In step 803, a characteristic of a feature (or joined) guiding template is determined from the characteristic of each guiding template for the two or more spatially proximate features. For example, the guiding template for each of the two or more spatially proximate features may be joined (e.g., merged) into a feature (or joined) guiding template. In an embodiment, in creating the feature (or joined) guiding template, the gaps between the respective guiding templates of the two or more spatially proximate features may be bridged and a curvature between the respective guiding templates of the two or more spatially proximate features may be smoothened. In an embodiment, no curvature on the feature (or joined) guiding template exceeds a maximum curvature that is a function of the wavelength and numerical aperture used in the lithography to form the feature (or joined) guiding template. In an embodiment, a computer algorithm generates the feature (or joined) guiding template layout based on (1) a minimum gap between features supported by the lithography process to generate the guiding template, (2) guiding template critical dimension (CD) defined by the self-assembly process and (3) the wavelength and numerical aperture of the lithography process. In an embodiment, the feature (or joined) guiding template layout is based on a function of the geometry of the guiding template as discussed herein. As discussed further below, the guiding template layout may be used in an OPC process. In an embodiment, the feature (or joined) guiding template may be determined, e.g., by a look-up in a table such as in FIGS. 5 and 6. Similarly, a feature (or joined) guiding template may be a combination of two or feature (or joined) guiding templates, which may be determined, e.g., by a look-up in a table such as in FIGS. 5 and 6. In optional step 804, a characteristic of the feature (or joined) guiding template is validated using any suitable method including first-principle calculation, to determine a difference between the two or more spatially proximate features and a BCP feature to be formed in the feature (or joined) guiding template. If the difference is greater than a threshold, the characteristic of the feature (or joined) guiding template may be adjusted. The validation may not be time consuming or computationally intensive because of the small area involved and the advanced nature of the guiding template.

Figure 9:
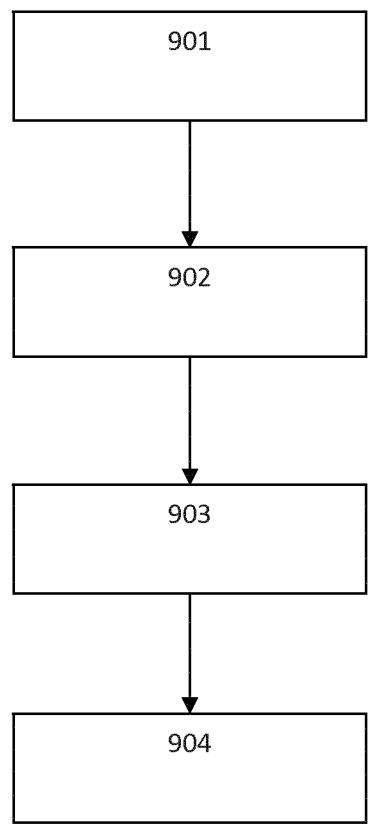
FIG. 9 is a flow chart of a method according to an embodiment.
Figure 10:
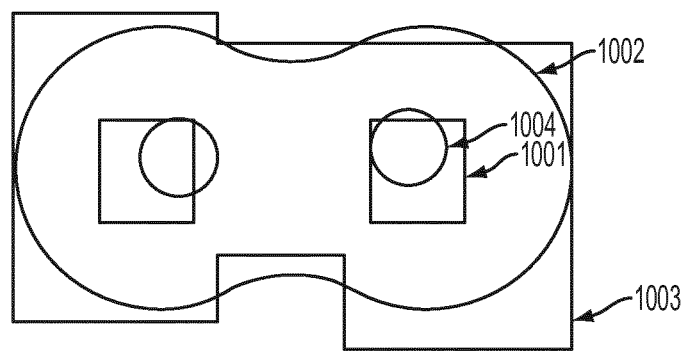
FIG. 10 schematically depicts an example in which a guiding template for several features is optimized by OPC into a pattern for a patterning device.

According to an embodiment, a method of designing a design layout, a guiding template and/or a patterning device pattern for a guiding template is illustrated by the flow chart in FIG. 9. In step 901, a design layout is obtained. For example, a full chip design may be analyzed for contact hole constructs, which may be extracted by a suitable algorithm. In step 902, one or more characteristics of a guiding template for one or more features of the design layout are determined using any suitable method such as a method disclosed herein and/or first-principle calculation. In step 903, the design layout, the one or more characteristics of the guiding template and/or a patterning device pattern to form the guiding template undergo OPC. In an embodiment, the OPC includes simulation of self-assembly of BCP using the guiding template. Thus, in an embodiment, the OPC cost function is 'aware' of the self-assembly process, e.g., the OPC is based on a calibrated lithography and self-assembly model. Even though the guiding template is optimized using OPC, the full chip OPC run time can be decreased by defining a nominal guiding template shape, using a method as discussed herein, that is close to the final optimized guiding template shape. In optional step 904, the design layout, the one or more characteristics of the guiding template and/or the patterning device pattern to form the guiding template, after OPC are verified. In an embodiment, the verification includes simulation of self-assembly of BCP using the guiding template. In an example shown in FIG. 10, a guiding template 1002 for features 1001 as designed is optimized by OPC into a pattern 1003 for a patterning device. Simulation of self-assembly shows the positions 1004 of the features 1001 after OPC is applied to the pattern 1003 to form the guiding template 1002.

Figure 11:
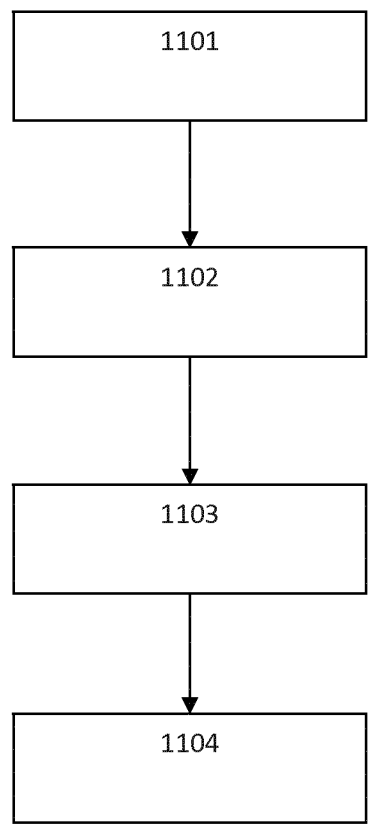
FIG. 11 is a flow chart of a method according to an embodiment.

According to an embodiment, a method of designing a design layout, a guiding template and/or a patterning device pattern for a guiding template is illustrated by the flow chart in FIG. 11. In step 1101, a design layout is obtained. For example, a full chip design may be analyzed for contact hole constructs, which may be extracted by a suitable algorithm. In step 1102, one or more characteristics of a guiding template for one or more features of the design layout are determined using any suitable method such as the methods disclosed herein and/or first-principle calculation and may include a function of the geometry of the guiding template as discussed herein. In step 1103, the design layout, the one or more characteristics of the guiding template and/or a patterning device pattern to form the guiding template undergo OPC. In this method, OPC need not include simulation of self-assembly of BCP using the guiding template.

In optional step 1104, the design layout, the one or more characteristics of the guiding template and/or the patterning device pattern to form the guiding template, after OPC are verified. In an embodiment, the verification includes simulation of self-assembly of BCP using the guiding template.

Figure 12:
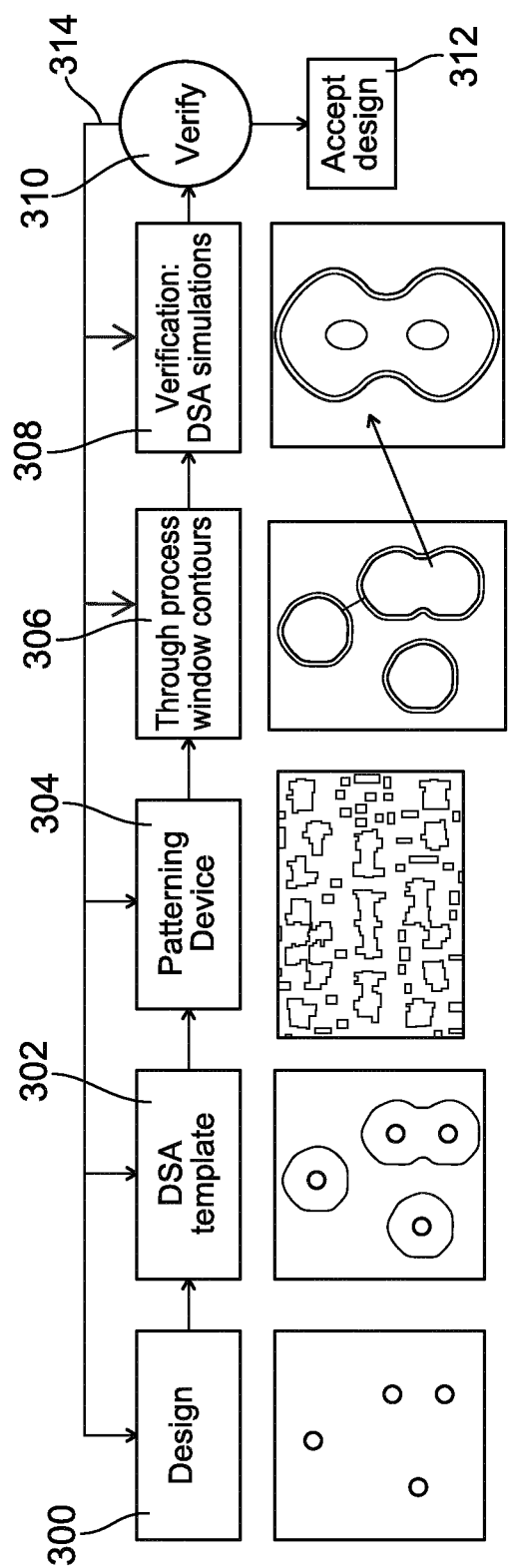
FIG. 12 is a schematic diagram of a method of designing a self-assembly process and its components.

Referring to FIG. 12, an embodiment of a design process is depicted of the design and/or manufacture of a component (e.g., a device) using self-assemblable block copolymer. In this process, a prediction may be made in advance of manufacture of how the block copolymer interacts with the pattern (e.g., printed lithography pattern) used to guide the self-assembly of the block copolymer. Further, the process may enable the calculation of the inverse problem namely knowing where the block copolymer feature should be located, determining, for example, the type of block copolymer that should be used and/or the pattern to be used to guide the self-assembly of the block copolymer.

At step 300, the initial design of the desired arrangement/pattern of the one or more self-assembled block copolymer features is provided. There may also be one of more constraints (rules) provided with respect to in what manner the initial design may be redesigned during the process. Such one or more rules may indicate, for example, by how much particular block copolymer features may shift and still be satisfactorily located. At step 300, the particular block copolymer to be used may be provided. There may also be one of more constraints (rules) provided with respect to in what manner the block copolymer may be redesigned during the process. Such one or more rules may indicate, for example, by how much the ratio of one polymer of the block copolymer may change with respect to another polymer of the block copolymer, whether one or more polymers may be added to, removed from or substituted in the block copolymer, etc.

At step 302, the design for the guiding template on the substrate that is used to guide the self-assembly of the block copolymer is determined. A directed self-assembly block copolymer model is used to translate the initial design to a directed self-assembly block copolymer guiding template, such as the one or more methods/models discussed herein. There may be one of more constraints (rules) with respect to in what manner the guiding template may be designed or redesigned during the process. Such one or more rules may indicate, for example, by how much a portion of a wall of a recess of the guiding template may be near another portion of the wall or another wall, a function of the geometry of the guiding template, etc. In an embodiment, the directed self-assembly block copolymer model for guiding template design is a fast model or set of rules that does not rely significantly on computationally heavy simulations. In an embodiment of a fast model or set of rules for guiding template design, the model may include a plurality of different standard block copolymer feature patterns and an associated guiding template recess shape for each such pattern to form that pattern. The model can then analyze the input desired block copolymer feature pattern to identify one or more of the plurality of different standard block copolymer feature patterns and then add the associated guiding template recess shape to the overall guiding template recess shape design. For example, as seen in FIG. 12, the isolated contact holes in the design at step 300 can be identified and associated round guiding templates are added to the guiding template design at step 302. Similarly, the pair of adjacent contact holes in the design at step 300 can be identified and an arrangement of feature (or joined) guiding templates (as discussed herein) may be added to the guiding template design at step 302. In an embodiment, the fast model or set of rules for guiding template design does not perform any simulations but rather exclusively relies on look-up and/or formula calculations. In an embodiment, the fast model or set of rules for guiding template design is a rule-based model, i.e., it relies, similar to rule-based OPC, on simple geometric rules to determine the designs and/or modifications which are to be applied as distinguished from relying on extensive lithography simulation and iteration to make the designs and/or modifications (like model-based OPC).

At step 304, the pattern of a patterning device (e.g., of an imprint template, of an optical lithography mask, of electron beam writer, etc.) used to create the guiding template on the substrate used to guide the self-assembly of the block copolymer is determined. And, at step 306, the transfer and printing of the patterning device pattern is simulated/calculated to arrive at the printed guiding template on the substrate used to guide the self-assembly of the block copolymer. One or more known computational lithography products, such as the ASML Tachyon computational lithography software products, can be used to calculate the pattern and simulate/calculate the transfer and printing of the pattern. For example, where the patterning device is an optical lithography mask, an optical proximity correction product can be used to calculate the mask pattern for the mask, including applying one or more reticle enhancement techniques (RET) such as scatter bars, serifs, etc., and a source-mask optimization (SMO) can optimize or match the illumination parameters with the mask pattern, all with the aim to print the pattern of the patterning device into the desired guiding template on the substrate used to guide the self-assembly of the block copolymer template. There may be one of more constraints (rules) with respect to the manner in which the pattern of the patterning device and/or transferring and printing (e.g., the resist choice, the illumination, etc.) of the patterning device pattern may be designed or redesigned during the process.

At step 308, the printed pattern determined at step 306 is verified. For example, a placement error verification analysis may be performed for the simulated/calculated self-assembly of block copolymer applied to the printed pattern determined at step 306. In an embodiment, the placement error of one or more block copolymer features is simulated and/or calculated using one or more of the methods described in, e.g., U.S. patent application U.S. 61/862,853, filed Aug. 6, 2013 and/or U.S. patent application U.S. 61/829,118 filed May 30, 2013, which are each incorporated herein in their entirety by reference, and compared to a threshold to determine whether the placement of the one or more block copolymer features is acceptable. In an embodiment, the placement error threshold is less than or equal to 5 nm, less than or equal to 4, less than or equal to 3 nm, less or equal to 2 nm, or less than or equal to 1 nm. A directed self-assembly block copolymer model is used to quantify and validate the printed one or more block copolymer features and optionally determine the expected dimensions of the one or more self-assembled block copolymer features. In an embodiment, the directed self-assembly block copolymer model is a fast model or set or rules that does not rely significantly on computationally heavy simulations. In an embodiment of a fast model or set of rules, the placement error and/or dimensions of various single block copolymer features (e.g., a contact hole of varying size) is calibrated based on rigorous and/or substrate simulations for various given block copolymers.

At point 310, if it is determined that the printed pattern is acceptable (e.g., within a threshold such as the placement error is within a threshold), the design and one or more associated self-assembly parameters (e.g., block copolymer type, self-assembly guiding template design, etc.) may be accepted at 312 and self-assembly may proceed using, for example, the design for the guiding template, the block copolymer selected during the design process, etc.

If it is determined that the printed pattern determined at step 306 is not acceptable, the design and/or one or more associated self-assembly parameters (e.g., block copolymer type, self-assembly guiding template design, etc.) may be modified at 314. The modifications can take numerous forms and at various junctions in the computational design process depicted in FIG. 12. In an embodiment, two or more parameter adjustments may need to be co-optimized and one or more of those parameters may be weighted more heavily than another. For example, an adjustment may involve adjustment of the shape of the guiding template and adjustment of a physical parameter of the block copolymer and thus the amount by which either parameter is adjusted may be performed using any known optimization technique, with or without weighting the adjustment of the shape of the guiding template higher or lower than adjustment of the physical parameter of the block copolymer. Any of these adjustments may be made based on, e.g., the amount of placement error of the BCP feature or an associated parameter (e.g., the offset amount and/or the length of the polymer type).

In an embodiment, the adjustment of the design and/or one or more associated self-assembly parameters may comprise adjusting a physical parameter of the block copolymer. For example, adjusting the physical parameter may comprise adjusting a ratio between the amount of a first polymer type and a second polymer type in the block copolymer. In an embodiment, adjusting the physical parameter comprises adding a further polymer type to or removing a polymer type from the block copolymer. In an embodiment, adjusting the physical parameter may comprise adjusting the length of a polymer type of the block copolymer. In an embodiment, adjusting the physical parameter may comprise adjusting a repellence between the first polymer type and the second polymer type or between the second polymer type and a portion of a guiding template to guide the self-assembly of the block copolymer of the block copolymer feature. The adjustment to the block copolymer may be made, for example, at step 308 and then the process proceeds from step 308 using the adjusted block copolymer. Alternatively, the adjustment to the block copolymer may be made, for example, at step 302 if the template design step involves the physical nature of the block copolymer and then the process proceeds from step 302 using the adjusted block copolymer.

In an embodiment, the adjustment of the design and/or one or more associated self-assembly parameters may comprise adjusting a design of the pattern of the patterning device (e.g., of an imprint template, of an optical lithography mask, of electron beam writer, etc.) used to create the guiding template on the substrate used to guide the self-assembly of the block copolymer is determined. For example, for an optical mask, one or more reticle enhancement techniques, such as a serif or a scatter bar, may be applied to the mask pattern. Additionally or alternatively, the adjustment of the design and/or one or more associated self-assembly parameters may comprise adjusting a parameter of the transfer and printing of the patterning device pattern. For example, for an optical mask, the illumination shape, illumination intensity, etc. may be adjusted. These adjustments may be made, for example, at step 304 and/or 306 and then the process proceeds therefrom using the applicable adjustment(s).

In an embodiment, the adjustment of the design and/or one or more associated self-assembly parameters may comprise adjusting a design of a guiding template to guide the self-assembly of the block copolymer of the block copolymer feature. In an embodiment, adjusting the guiding template comprises adjusting a shape of a recess portion of the template. For example, one or more template enhancement techniques, similar to reticle enhancement technique, may be applied to the guiding template pattern. Alternatively or additionally, a different fundamental guiding template shape may be applied to a particular block copolymer feature than previously applied. For example, a heavily overlapping double circle recess guiding template shape or a square recess shape may be applied in the guiding template design at step 302 for an isolated contact hole of the design shown in step 300 instead of a round recess shape as shown in the template design at step 302. These adjustments may be made, for example, at step 302 and then the process proceeds therefrom using the applicable adjustment(s).

In an embodiment, the adjustment of the design and/or one or more associated self-assembly parameters may comprise adjusting the design of the pattern of block copolymer features shown at step 300. In other words, the fundamental design of the block copolymer features may need to be redesigned because perhaps the features are too close to each other to be practically created. Thus, for example, the layout of the pattern of block copolymer features may be changed in terms of feature size, feature pitch, feature layout, etc. These adjustments may be made, for example, at step 300 and then the process proceeds therefrom using the applicable adjustment(s).

In an embodiment, the adjustment of the design and/or one or more associated self-assembly parameters may comprise adjusting a repellence of a portion of a guiding template to guide the self-assembly of the block copolymer of the block copolymer feature, to the first polymer type and/or the second polymer type.

While the design process has been described in terms of realizing a desired arrangement/pattern of one of self-assembled block copolymer features, the process may be augmented to further include simulation and/or modelling of subsequent process steps such as etching, etc. The results of such further process steps may be fed back or fed forward into the process as appropriate to further refine the initial design, the type of block copolymer, the guiding template used to guide the self-assembly of the block copolymer, etc.

One or more of the techniques and/or features described in U.S. patent application publication no. 2012/0331428, which is incorporated herein its entirety by reference, may incorporated in a method as described herein.

The term type A polymer domain should not be limited to a specific type of polymer domain. The terms type A polymer domain and type B polymer domain are used solely to differentiate between different polymer domains with reference to the Figures.

A recess, BCP feature, and/or first domain shape other than cylindrical as described above may be used (e.g., simulated and designed) according to an embodiment. For example, a spherical, elliptical, rectangular, lamellar, cubic, tetragonal or hexagonal feature shape may be simulated and designed using the uncertainty in the positioning of a polymer domain within the feature. Cylindrical features which are joined by a linear trench-like feature may be simulated and designed using polymer domain feature position uncertainties.

As noted above, the use of resist to form a sidewall of a recess is intended to be an example, rather than a limiting feature. For example, a recess may be provided by patterning of the substrate itself, or patterning of a layer deposited or grown onto the substrate. A recess may itself be provided by the self-assembly of BCP material.

Figure 13:
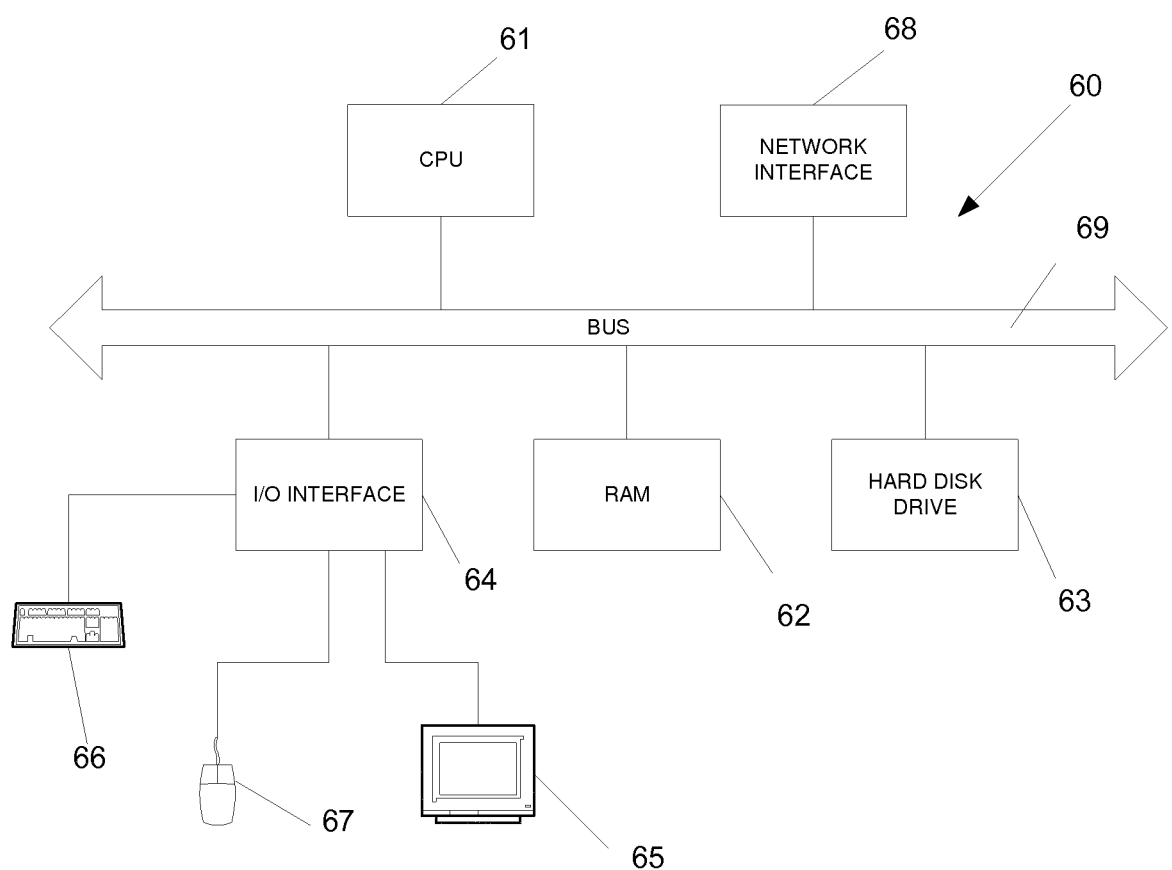
FIG. 13 is a schematic depiction of a computer suitable for implementing an embodiment.

FIG. 13 shows a computer 60. The computer 60 may implement any of the methods described herein including implement a simulation of a BCP feature and/or calculate a guiding template using any of the methods described herein. The computer 60 comprises a CPU (central processing unit) 61 (e.g., a physical processor) which is configured to read and execute instructions stored in a memory 62 (e.g., a physical memory) which may take the form of a random access memory. The memory 62 stores instructions for execution by the CPU 61 and data used by those instructions. For example, in use, a digital representation of a BCP feature and/or associated parameters (e.g., the block copolymer types, the BCP feature design shape, etc.) may be stored in the memory 62, together with instructions suitable for causing the computer to carry out a method as described herein.

The computer 60 may further comprise storage, for example, in the form of a hard disc drive 63. The digital representation of the BCP feature and/or the associated parameters may be stored on the hard disc drive 63. The computer 60 may further comprise an I/O (input/output) interface 64 to which is connected one or more peripheral devices used in connection with the computer 60. For instance, a display 65 may be provided so as to display output from the computer 60. The display 65 may, for example, display a representation of the BCP feature. Additionally, the display 65 may display one or more images generated by processing of the simulated BCP feature, or a design of a substrate such as shown in FIG. 2. One or more input devices may be connected to the interface 64. Such an input device may include a keyboard 66 and/or a mouse 67 which allows user interaction with the computer 60.

A network interface 68 may be provided to allow the computer 60 to be connected to an appropriate computer network so as to receive and/or transmit data from and to other computing devices. The CPU 61, memory 62, storage 63, I/O interface 64 and network interface 68, are connected together by a bus 69.

In an embodiment, there is provided a method of designing a feature guiding template for guiding self-assembly of block copolymer to form at least two features in a design layout for lithography, the feature guiding template comprising at least two portions joined by a bottleneck, the method comprising: determining a characteristic of the feature guiding template based on at least a function of geometry of the feature guiding template comprising a value of a width of the bottleneck, or a value based on, or comprising, both a width of at least one of the portions and the width of the bottleneck.

In an embodiment, there is provided a method of determining a characteristic of a feature guiding template for guiding self-assembly of block copolymer to form at least two features in a design layout for lithography, the method comprising: determining a guiding template for each of the at least two features without accounting for the others of the at least two features; and determining a characteristic of the feature guiding template based on at least a function of geometry of the feature guiding template, the feature guiding template being the joining of each of the guiding templates for the two or more features.

In an embodiment, the characteristic comprises one or more selected from: height, shape, feature spacing, material, side wall angle and/or surface chemistry. In an embodiment, the at least two features comprise one or more features selected from: a contact hole, an isolation trench, a via, a lead, a mask cut line, and/or a gate electrode. In an embodiment, determining the characteristic is further based on one or more selected from: placement error of at least one of the features, chemical composition of at least one polymer of the block copolymer, structure of the block copolymer, thickness of the block copolymer, annealing temperature of the block copolymer, annealing rate of the block copolymer, and/or a solvent for the block copolymer. In an embodiment, the feature guiding template comprises at least two portions joined by a bottleneck. In an embodiment, the function of geometry comprises a width of at least one of the portions and/or a width of the bottleneck. In an embodiment, the function of geometry comprises a ratio between the width of at least one of the portions and the width of the bottleneck. In an embodiment, the ratio is a ratio of the width of the bottleneck to the width of at least one of the portions. In an embodiment, the ratio is not greater than 0.5. In an embodiment, the ratio is not smaller than 0.3.

In an embodiment, there is provided a method, comprising designing a geometric characteristic of a feature guiding template based on at least a function of geometry of the feature guiding template, the feature guiding template for guiding self-assembly of block copolymer to form at least two features in a design layout for lithography and comprising at least two portions joined by a bottleneck.

In an embodiment, the characteristic comprises one or more selected from: height, shape, sidewall angle and/or feature spacing. In an embodiment, the at least two features comprise one or more features selected from: a contact hole, an isolation trench, a via, a lead, a mask cut line and/or a gate electrode. In an embodiment, designing the characteristic is further based on one or more selected from: placement error of at least one of the features, chemical composition of at least one polymer of the block copolymer, structure of the block copolymer, thickness of the block copolymer, annealing temperature of the block copolymer, annealing rate of the block copolymer, and/or a solvent for the block copolymer. In an embodiment, the function of geometry comprises a width of at least one of the portions and/or a width of the bottleneck. In an embodiment, the function of geometry comprises a value of a width of the bottleneck or a value based on, or comprising, both a width of at least one of the portions and the width of the bottleneck. In an embodiment, the value is a ratio between the width of at least one of the portions and the width of the bottleneck. In an embodiment, the ratio is a ratio of the width of the bottleneck to the width of at least one of the portions. In an embodiment, the ratio is not greater than 0.5. In an embodiment, the ratio is not smaller than 0.3. In an embodiment, the ratio is selected from 0.48 to 0.52.

In an embodiment, there is provided a computer readable non-transitory medium with instructions stored therein, configured to cause a computer to carry out a method as described herein.

In an embodiment, there is provided a computer apparatus comprising: a physical memory storing processor readable instructions, and a physical processor arranged to read and execute instructions stored in the physical memory, wherein the physical processor readable instructions comprise instructions arranged to control the computer to carry out a method as described herein.

In an embodiment, there is provided a feature guiding template designed using a method, medium or apparatus as described herein. In an embodiment, there is provided an integrated circuit produced using the feature guiding template as described herein.

In an embodiment, there is provided a feature guiding template comprising two or more portions connected to an element, wherein a ratio of a width of the element to a width of at least one of the two or more portions is selected from 0.3 to 0.5. In an embodiment, the width of at least one of the two or more portions is selected from 30 to 60 nm. In an embodiment, the width of the one or more elements is selected from 9 to 30 nm. In an embodiment, a center-to-center distance of at least two of the two or more portions is selected from 22 to 66 nm. In an embodiment, the ratio is about 0.5. In an embodiment, the ratio is selected from 0.49-0.51. In an embodiment, the ratio is selected from 0.48-0.52. In an embodiment, the ratio is selected from 0.47-0.53. In an embodiment, the ratio is selected from 0.46-0.53. In an embodiment, the ratio is selected from 0.45-0.53. In an embodiment, the two or more portions have substantially the same width.

Aspects of the invention can be implemented in any convenient form. For example, an embodiment may be implemented by one or more appropriate computer programs which may be carried on an appropriate carrier medium which may be a tangible carrier medium (e.g. a disk) or an intangible carrier medium (e.g. a communications signal). Embodiments of the invention may be implemented using suitable apparatus which may specifically take the form of a programmable computer running a computer program arranged to implement a method as described herein.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the appended claims.

What is claimed is:

1. A method of designing a feature guiding template for guiding self-assembly of block copolymer to form at least two features in a design layout, the feature guiding template comprising at least two portions joined by a bottleneck, the method comprising:
   determining a characteristic of the feature guiding template based on at least i) a simulated or modeled placement error and/or a function of wavelength and numerical aperture of a lithography process for forming a tangible form of the feature guiding template, and ii) a function of geometry of the feature guiding template, the function of geometry comprising a ratio between a variable representing a dimension of the bottleneck and a variable representing a value of a dimension in a direction across at least one of the portions; and
   producing electronic data, based on the characteristic, representing the feature guiding template,
   wherein the electronic data is provided for manufacturing the tangible form of the feature guiding template to guide self-assembly of block copolymer.

2. The method of claim 1, wherein the haracteristic comprises one or more selected from: height, shape, feature spacing, material, side wall angle and/or surface chemistry.

3. The method of claim 1, wherein the at least two features comprise one or more selected from: a contact hole, an isolation trench, a via, a lead, a mask cut line, and/or a gate electrode.

4. The method of claim 1, wherein determining the characteristic is further based on one or more selected from: chemical composition of at least one polymer of the block copolymer, structure of the block copolymer, thickness of the block copolymer, annealing temperature of the block copolymer, annealing rate of the block copolymer, and/or a solvent for the block copolymer.

5. The method of claim 1, wherein the variable representing a dimension of the bottleneck is a width of the bottleneck and the variable representing a value of a dimension in a direction across at least one of the portions is a width of the at least one of the portions.

6. The method of claim 5, wherein the ratio is a ratio of the width of the bottleneck to the width of at least one of the portions.

7. The method of claim 6, wherein the ratio is not greater than 0.5.

8. The method of claim 6, wherein the ratio is not smaller than 0.3.

9. The method of claim 1, wherein the joint protrudes from the at least two portions and the dimension of the bottleneck is at a position on the joint outside of the at least two portions.

10. The method of claim 1, wherein the determining the characteristic of the feature guiding template is based on at least a function of wavelength and numerical aperture of a lithography process for forming a tangible form of the feature guiding template, and the function of geometry of the feature guiding template.

11. A method of determining a characteristic of a feature guiding template for guiding self-assembly of block copolymer to form at least two features in a design layout, the method comprising:
    determining a guiding template for each of the at least two features without accounting for the one or more others of the at least two features, wherein the feature guiding template comprises a joint between at least two of the guiding templates;
    determining a characteristic of the feature guiding template based on at least i) a simulated or modeled placement error and/or a function of wavelength and numerical aperture of a lithography process for forming a tangible form of the feature guiding template, and ii) function of a ratio between a variable representing a value of a dimension of the joint and a variable representing a value of a dimension in a direction across at least one of the guiding templates; and
    producing electronic data, based on the characteristic, representing the feature guiding template,
    wherein the electronic data is provided for manufacturing a tangible form of the feature guiding template to guide self-assembly of block copolymer.

12. The method of claim 11, wherein the feature guiding template comprises at least two portions joined by a bottleneck.

13. The method of claim 11, wherein the variable representing a value of a dimension in a direction across at least one of the guiding templates comprises a width of the at least one of the guiding templates and/or the variable representing a value of a dimension of the joint comprises a width of a bottleneck at the joint.

14. The method of claim 11, wherein the variable representing a dimension of the joint is a width of the joint and the variable representing a value of a dimension in a direction across at least one of the portions is a width of the at least one of the portions.

15. The method of claim 11, wherein the joint protrudes from the at least two guiding templates and the dimension of the bottleneck is at a position on the joint outside of the at least two guiding templates.

16. The method of claim 11, wherein the determining the characteristic of the feature guiding template is based on at least a function of wavelength and numerical aperture of a lithography process for forming a tangible form of the feature guiding template, and the function of a ratio between a variable representing a value of a dimension of the joint and a variable representing a value of a dimension in a direction across at least one of the guiding templates.

17. A method, comprising:
designing a geometric characteristic of a feature guiding template based on at least i) a simulated or modeled placement error and/or a function of wavelength and numerical aperture of a lithography process for forming a tangible form of the feature guiding template, and ii) a function of geometry of the feature guiding template, the feature guiding template for guiding self-assembly of block copolymer to form at least two features in a design layout and comprising at least two portions joined by a bottleneck and the function of geometry including a ratio between a variable representing a value of a dimension of the bottleneck and a variable representing a value of a dimension in a direction across at least one of the at least two portions; and
manufacturing a tangible form of the feature guiding template having the geometric characteristic.

18. The method of claim 17, wherein the characteristic comprises one or more selected from: height, shape, sidewall angle and/or feature spacing.

19. The method of claim 17, wherein the at least two features comprise one or more selected from a contact hole, an isolation trench, a via, a lead, a mask cut line and/or a gate electrode.

20. The method of claim 17, wherein designing the characteristic is further based on one or more selected from: chemical composition of at least one polymer of the block copolymer, structure of the block copolymer, thickness of the block copolymer, annealing temperature of the block copolymer, annealing rate of the block copolymer, and/or a solvent for the block copolymer.

21. The method of claim 17, wherein the variable representing a value of a dimension in a direction across at least one of the at least two portions comprises a width of the at least one of the portions and/or the variable representing a value of a dimension of the bottleneck comprises a width of the bottleneck.

22. The method of claim 17, wherein the variable representing a dimension of the bottleneck is a width of the bottleneck and the variable representing a value of a dimension in a direction across at least one of the portions is a width of the at least one of the portions.

23. The method of claim 22, wherein the ratio is a ratio of the width of the bottleneck to the width of at least one of the portions.

24. The method of claim 23, wherein the ratio is not greater than 0.5.

25. The method of claim 23, wherein the ratio is not smaller than 0.3.

26. The method of claim 23, wherein the ratio is selected from 0.48 to 0.52.

27. The method of claim 17, wherein the bottleneck protrudes from the at least two portions and the dimension of the bottleneck is at a position on the bottleneck outside of the at least two portions.

28. The method of claim 17, wherein the designing the geometric characteristic of a feature guiding template is based on at least a function of wavelength and numerical aperture of a lithography process for forming a tangible form of the feature guiding template, and the function of geometry of the feature guiding template.

* * * * *